United States Patent [19]
Takase

[11] Patent Number: 5,321,546
[45] Date of Patent: Jun. 14, 1994

[54] SWITCHING VARIABLE MAGNIFICATION FINDER

[75] Inventor: Hiroshi Takase, Hachiouji, Japan

[73] Assignee: Olympus Optical Co., Ltd., Tokyo, Japan

[21] Appl. No.: 951,000

[22] Filed: Sep. 25, 1992

[30] Foreign Application Priority Data

Sep. 26, 1991 [JP] Japan .................. 3-247776

[51] Int. Cl.$^5$ .................. G02B 23/14; G02B 15/02; G03B 13/10
[52] U.S. Cl. .................. 359/421; 359/821
[58] Field of Search .......... 359/421, 422, 431, 837, 359/821, 726

[56] References Cited

U.S. PATENT DOCUMENTS 1,094,724  4/1914  Konig .................. 359/421
4,486,069 12/1984  Neil et al. ............ 359/421

FOREIGN PATENT DOCUMENTS 2046416  3/1972  France .................. 359/421
2304094 10/1976  France .................. 359/421
1255825 10/1989  Japan .

Primary Examiner—Jon W. Henry
Attorney, Agent, or Firm—Cushman, Darby & Cushman

[57] ABSTRACT

A switching variable magnification finder includes an objective lens system having a positive refracting power, an image erecting optical system for erecting an image formed by the objective lens system, and an eyepiece system having a positive refracting power, in which an auxiliary lens system is removably disposed behind the objective lens system so that magnification is varied according to the insertion or removal of the auxiliary lens system. Thus, the switching variable magnification finder allows magnification to be changed without increasing the overall of the finder optical system and moving the objective lens system and its switching mechanism to be simplified.

10 Claims, 3 Drawing Sheets

SWITCHING VARIABLE MAGNIFICATION FINDER

BACKGROUND OF THE INVENTION a) Field of the Invention

This invention relates to a switching variable magnification finder for use in photographic, video, and still video cameras.

b) Description of the Prior Art

In a camera in which a photographing optical system is in general disposed independent of a finder optical system, it is required that when the focal length of the photographing optical system is changed, the magnification of field of the finder optical system is also changed at the same time to thereby exhibit properly its photographic range. A system of switching the magnification of finder, for example, is available as follows: The finder optical system set forth in Japanese Patent Preliminary Publication No. Hei 1-255825 is designed so that an afocal auxiliary lens system is disposed removably with respect to an effective optical path of the finder optical system on the object side of an objective lens system, and inserted in or removed from the optical path in accordance with the magnification of photography, thereby switching the magnification of field.

With such a system, however, it is necessary for the optical system to secure sufficient space for the insertion or removal of the auxiliary lens system on the object side of the objective lens system fixedly disposed. Thus, the overall length of the finder optical system is greatly increased and the thickness of a camera body is difficult to be reduced, with resultant oversizing of the camera body. This offers a serious problem in view of the fact that the finder optical system of the type is often employed in small-sized cameras such as compact cameras.

SUMMARY OF THE INVENTION

It is, therefore, an object of the present invention to provide a switching variable magnification finder constructed so that magnification is varied by the insertion or removal of the auxiliary lens system without increasing the overall length of the finder optical system.

This object is accomplished, according to the present invention, by the arrangement that, in a real image mode finder comprising an objective lens system having a positive refracting power, an image erecting optical system inverting an image formed through the objective lens system, and an eyepiece system having a positive refracting power, an auxiliary lens system having a refracting power is removably disposed behind the objective lens system so that magnification is varied by the insertion or removal of the auxiliary lens system.

According to the present invention, the objective lens system is designed so as not to move upon inserting or removing the auxiliary lens system.

This and other objects as well as the features and advantages of the present invention will become apparent from the following detailed description of the preferred embodiment when taken in conjunction with the accompanying drawings.

DETAILED DESCRIPTION OF THE PREFERRED EMBODIMENT

Figure 1:
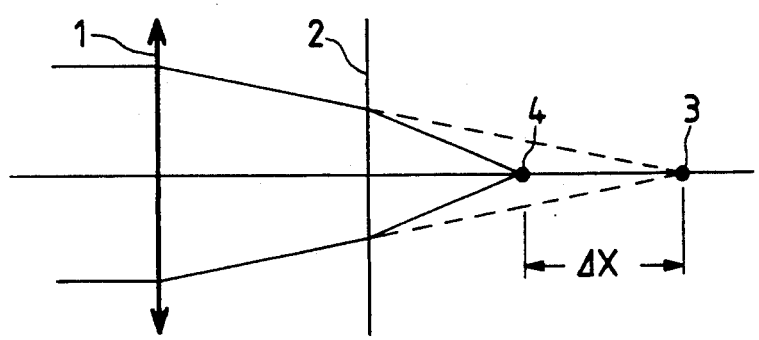
FIG. 1 is a view showing the configuration of an essential part for explaining the principle of the finder optical system according to present invention.

Referring now FIGS. 1 and 2, prior to describing the embodiment, the principle of the present invention will be explained.

In these figures, an auxiliary lens system 2 is removably disposed behind an objective lens system 1, namely, on the image plane side, and the auxiliary lens system 2 is inserted in or removed from an effective optical path of the finder optical system, thereby varying magnification. In the case where the auxiliary lens system is located outside the optical path, beams of light (indicated by broken lines in FIG. 1) for image formation of an object are imaged at an image point 3 by virtue of the objective lens system alone so that the image at this position is observed through the eyepiece system not shown. On the other hand, in a state where the auxiliary lens system is inserted in the optical path, the imaging position of the object is shown at an image point 4.

Now, when the focal length of the auxiliary lens system 2 is represented by $f_A$ and the magnification of the auxiliary lens system 2 by $\beta_A$, a distance $\Delta X$ between the image point 3 formed by the objective lens system 1 and the image point 4 where the auxiliary lens system 2 is inserted is defined as $$\Delta X = -f_A(1-\beta_A)^2/\beta_A \tag{1}$$

Here, if $f_A < 0$, the distance $\Delta X$ between the image points 3 and 4 will increase, so that the objective lens system 1 must be moved toward the object in order that the position of the image observed through the eyepiece system remains unchanged. This causes the increase of the overall length of the finder optical system due to the insertion of the auxiliary lens system 2, which defeats the object it is intended to promote. It is therefore required that the focal length of the auxiliary lens system 2 is positive ($f_A > 0$).

Figure 2:
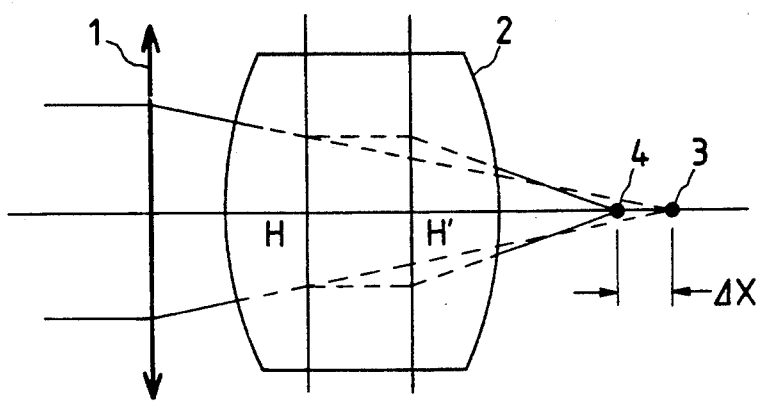
FIG. 2 is a view showing the configuration of an essential part in which a thick lens system is disposed as an auxiliary lens system in FIG. 1.

Further, in view of the fact that the auxiliary lens system 2 is of large thickness as depicted in FIG. 2, the distance $\Delta X$ between the image point 3 formed by the objective lens system 1 where the auxiliary lens system 2 is situated outside the optical path and the image point 4 where the auxiliary lens system 2 is inserted therein, when the distance between the principal points of the auxiliary lens system 2 is designated by $HH'_A$, is defined as $$\Delta X = HH'_A - f_A(1-\beta_A)^2/\beta_A \quad (2)$$

Hence, by choosing properly the distance $HH'_A$ between the principal points of the auxiliary lens system 2, the distance $\Delta X$ between the image points 3 and 4 can be reduced to zero, that is, magnification can be varied with the objective lens system 1 fixed. In this case, the operation for changing magnification can be performed only by the insertion or removal of the auxiliary lens system 2 and consequently, the mechanism for changing magnification is simplified.

The above description has been made of the case where the position of the image to be observed is not shifted from the image point 3, irrespective of the insertion and removal of the auxiliary lens system 2, but human eyes have a focus adjusting function by themselves and hence, observation will not be obstructed by a slight shift of the image position.

Here, when the focal length of the entire optical system subsequent to the imaging position due to the objective lens system 1, namely, the image point 3, is represented by $f_e$, a deviation $\Delta\sigma$ of diopter to the shift $\Delta X$ of the position of the image point to be observed is approximately given, according to Newton's formula, by $$\Delta\sigma = 1000 \, \Delta X/f_e^2 \quad (3)$$

If, in general, $|\Delta\sigma| \leq 2$, the shift of the image position can be adjusted with the naked eyes, so that if the following condition is fulfilled in terms of Eqs. (2) and (3), observation can be made without practical obstruction even though the image position is shifted due to the insertion and removal of the auxiliary lens system 2:

$$\left| \frac{1000}{f_e^2} \left( HH'_A - \frac{f_A(1-\beta_A)^2}{\beta_A} \right) \right| \leq 2 \quad (4)$$

Hence, if the auxiliary lens system 2 is set so as to satisfy Eq. (4) with respect to the objective lens system 1, the magnification of the finder optical system can be switched, without moving the objective lens system 1, only by the insertion or removal of the auxiliary lens system 2. Thus, magnification can be varied without increasing the entire length of the finder optical system and the mechanism for magnification change can also be simplified.

In accordance with FIGS. 3 to 6, an embodiment of the present invention will be explained below.

Figure 3:
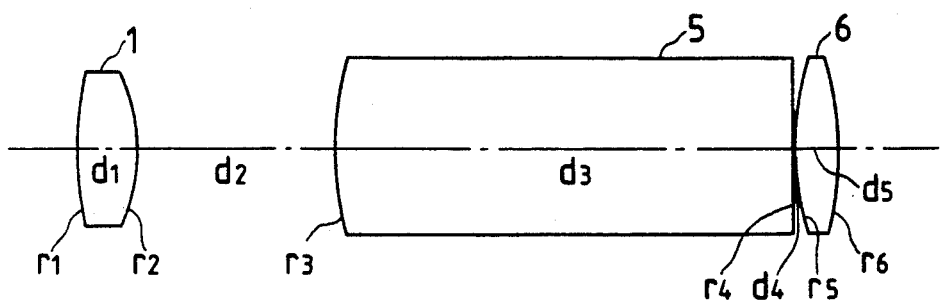
FIG. 3 is a developed representation in the direction of an optical axis, showing a fundamental configuration of the finder optical system of an embodiment according to the present invention.

FIG. 3 shows the fundamental configuration of the finder optical system, that is, the configuration of the optical system where the auxiliary lens system 2 is located outside the optical path, developed along the optical axis, in which an image erecting optical system 5 for erecting the image and an eyepiece system 6 are disposed in order behind the objective lens system 1.

Figure 4:
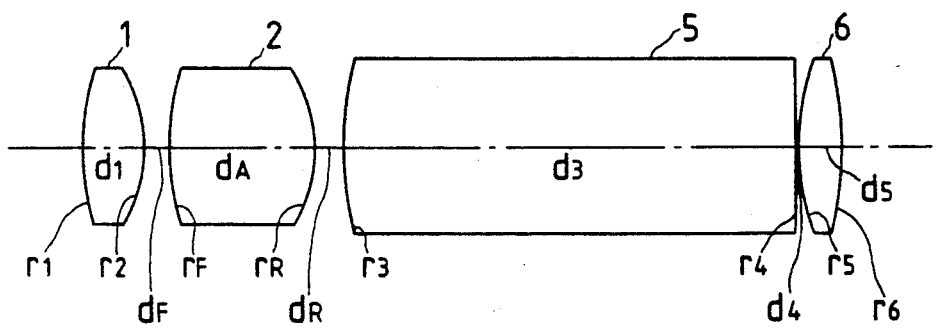
FIG. 4 is a developed representation in the direction of the optical axis where the auxiliary lens system is inserted in an optical path with respect to the finder optical system in FIG. 3.

FIG. 4 shows the configuration of the finder optical system where the auxiliary lens system 2 is placed in the optical path, developed along the optical axis, in which the auxiliary lens system 2 is situated behind the objective lens system 1.

Figure 5:
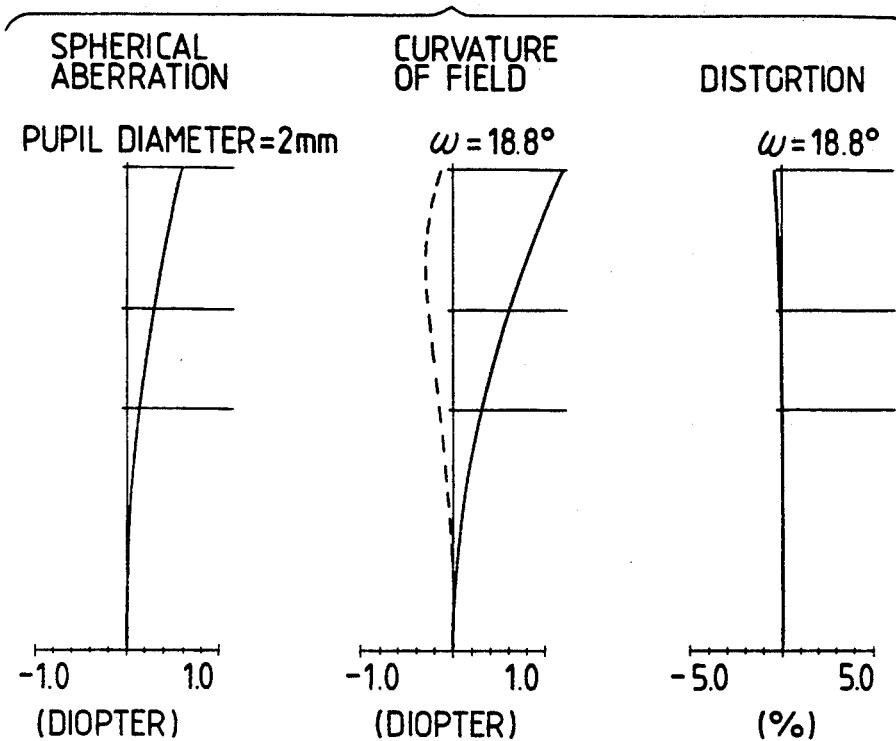
FIG. 5 is respective diagrams of aberration curves in a state of the fundamental configuration of the embodiment of the present invention.
Figure 6:
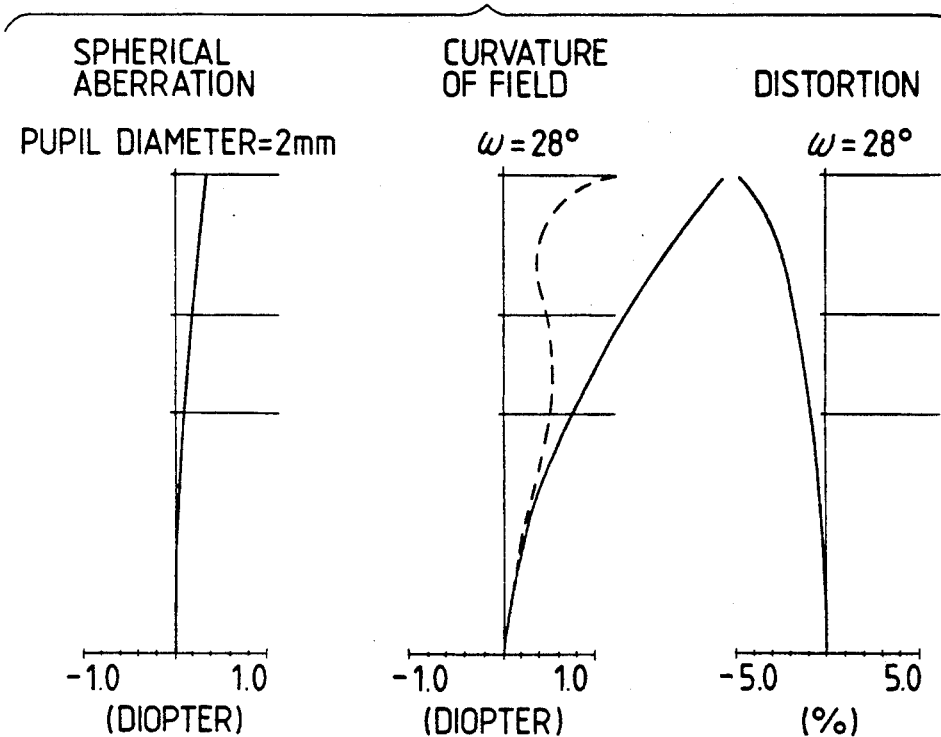
FIG. 6 is respective diagrams of aberration curves in a state where the auxiliary lens system is inserted in the optical path, of the embodiment of the present invention.

FIGS. 5 and 6 are aberration curve diagrams showing spherical aberration, curvature of field, and distortion of the finder optical system where the auxiliary lens system 2 is situated outside and in the optical path, respectively.

The numerical data of the embodiment are as follows:

(Fundamental configuration)
$\omega = 18.8°$
$r1 = 19.5001$
$\quad d1 = 4.000 \quad n1 = 1.49230 \quad \nu1 = 57.71$
$r2 = -9.6764$ (aspherical)
$\quad d2 = 13.3014$
$r3 = 21.5801$
$\quad d3 = 30.5161 \quad n2 = 1.49230 \quad \nu2 = 57.71$
$r4 = \infty$
$\quad d4 = 0.2000$
$r5 = 17.6046$ (aspherical)
$\quad d5 = 2.5000 \quad n3 = 1.49230 \quad \nu3 = 57.71$
$r6 = -27.3286$
Aspherical coefficients
Second surface
$\quad P = 1.2556, \; E = 0.26962 \times 10^{-3}, \; F = 0.25505 \times 10^{-5},$
$\quad G = -0.49236 \times 10^{-7}, \; H = 0.73175 \times 10^{-9}$
Fifth surface
$\quad P = 1, \quad E = -0.55186 \times 10^{-4}, \; F = 0.17827 \times 10^{-6},$
$\quad G = -0.10366 \times 10^{-7}, \; H = 0.10093 \times 10^{-9}$ (Insertion of the auxiliary lens system 2)
$\omega = 28°$
$r1 = 19.5001$
$\quad d1 = 4.000 \quad n1 = 1.49230 \quad \nu1 = 57.71$
$r2 = -9.6764$ (aspherical)
$rF = 14.4842$
$\quad dF = 1.7016$
$\quad dA = 9.8000 \quad n2 = 1.49230 \quad \nu2 = 57.71$
$rR = 5.4662$ (aspherical)
$\quad dR = 1.7998$
$r3 = 21.5801$
$\quad d3 = 30.5161 \quad n3 = 1.49230 \quad \nu3 = 57.71$
$r4 = \infty$
$\quad d4 = 2000$
$r5 = 17.6046$ (aspherical)
$\quad d5 = 2.5000 \quad n4 = 1.49230 \quad \nu4 = 57.71$
$r6 = -27.3286$
Aspherical coefficients
Second surface
$\quad P = 1.2556, \; E = 0.26962 \times 10^{-3}, \; F = 0.25505 \times 10^{-5},$
$\quad G = -0.49236 \times 10^{-7}, \; H = 0.73175 \times 10^{-9}$
R-th surface
$\quad P = 1, \quad E = 0.28921 \times 10^{-2}, \; F = -0.29578 \times 10^{-5},$
Fifth surface
$\quad P = 1, \quad E = -0.55186 \times 10^{-4}, \; F = 0.17827 \times 10^{-6},$
$\quad G = -0.10366 \times 10^{-7}, \; H = 0.10093 \times 10^{-9}$ Here, in the above embodiment, reference symbols r1, r2, ... represents radii of curvature of individual lens surfaces; d1, d2, ... thicknesses of individual lenses or spaces therebetween; n1, n2, ... refractive indices of individual lenses; and $\nu1$, $\nu2$, ... Abbe's numbers of individual lenses measured on the d line.

Also, the configurations of the aspherical surfaces in the embodiment are expressed by the following equation:

$$X = \frac{S^2/r}{1 + \sqrt{1 - PS^2/r^2}} + ES^4 + FS^6 + GS^8 + HS^{10}$$

where X represents the coordinates in the direction of the optical axis, S the coordinates in the direction normal to the optical axis, r the radius of curvature in the vicinity of the vertex of the aspherical surface, P the constant of the cone, and E, F, G, and H aspherical coefficients.

What is claimed is:

1. A switching variable magnification finder including a finder optical system for observing an image of an object photographed by a photographing optical system comprising:
- an objective lens system having a positive refracting power;
- an image erecting optical system for erecting an image formed through said objective lens system;
- an eyepiece system having a positive refracting power; and
- an auxiliary lens system having a single positive lens and being removably disposed in an optical path between said objective lens system and said image erecting optical system,
- wherein, by one of insertion and removal of said auxiliary lens system into the optical path, said finder optical system changes in field magnification at the same time as a change in focal length of the photographing optical system so as to properly indicate a photographic range.

2. A switching variable magnification finder including a finder optical system for observing an image of an object photographed by a photographing optical system, comprising:
- an objective lens system having a positive refracting power;
- an image erecting optical system for erecting an image formed through said objective lens system;
- an eyepiece system having a positive refracting power; and
- an auxiliary lens system being a single positive lens, with object-side and eyepiece-side surfaces thereof having a positive power, and being removably disposed in an optical path between said objective lens system and said image erecting optical system,
- wherein by one of insertion into the optical path and removal from said optical path of said auxiliary lens system, said finder optical system changes in field magnification at the same time as a change in focal length of the photographing optical system to properly indicate a photographic range.

3. A switching variable magnification finder including a finder optical system for observing an image of an object photographed by a photographing optical system, comprising:
- an objective lens system having a positive refracting power;
- an image erecting optical system for erecting an image formed through said objective lens system;
- an eyepiece system having a positive refracting power; and
- an auxiliary lens system being a single positive double convex lens and removably disposed in an optical path between said objective lens system and said image erecting optical system,
- wherein, by one of insertion into the optical path and removal from the optical path of said auxiliary lens system, said finder optical system changes in field magnification at the same time as a change in focal length of the photographing optical system to properly indicate a photographic range.

4. A switching variable magnification finder including a finder optical system for observing an image of an object photographed by a photographing optical system, comprising:
- an objective lens system having a positive refracting power;
- an image erecting optical system for erecting an image formed through said objective lens system;
- an eyepiece system having a positive refracting power; and
- an auxiliary lens system being a single positive lens having an aspherical surface on an eyepiece side thereof and removably disposed in an optical path between said objective lens system and said image erecting optical system,
- wherein, by one of insertion into the optical path and removal from the optical path of said auxiliary lens system, said finder optical system changes in field magnification at the same time as a change in focal length of the photographing optical system to properly indicate a photographic range.

5. The finder according to any one of claims 1, 2, 3, or 4, wherein said objective lens system remains fixed in position during one of said insertion and removal of said auxiliary lens system.

6. The finder according to any one of claims 1, 2, 3 or 4, satisfying the condition:

$$\left| \frac{1000}{f_e^2} \left( HH'_A - \frac{f_A(1 - \beta_A)^2}{\beta_A} \right) \right| \leq 2$$

where $f_e$ is the focal length of the entire optical system subsequent to the imaging position due to the objective lens system, $HH'_A$ is the distance between the principal points of the auxiliary lens system, $f_A$ is the focal length of the auxiliary lens system, and $\beta_A$ is the magnification of the auxiliary lens system.

7. The finder according to any one of claims 1, 2, 3 or 4, wherein said auxiliary lens system has an aspherical surface.

8. The finder according to claim 1, wherein said objective lens system has at least one aspherical surface.

9. The finder according to claims 8, wherein said eyepiece system has at least one aspherical surface.

10. The finder according to claim 7, wherein said objective lens system has at least one aspherical surface.

* * * * *